United States Patent [19]

Adlon et al.

[11] 4,045,896

[45] Sept. 6, 1977

[54] X-RAY FILM STORAGE AND VIEWING DEVICE

[75] Inventors: Bruce E. Adlon, Northbrook; Walter H. Villiers, Chicago; Sherwin S. Tarnoff, Northbrook, all of Ill.

[73] Assignee: General Electric Company, Milwaukee, Wis.

[21] Appl. No.: 635,322

[22] Filed: Nov. 26, 1975

[51] Int. Cl.² .................. G09F 11/32; G09F 13/10
[52] U.S. Cl. ..................... 40/106.1; 40/36; 40/132 D
[58] Field of Search ............ 40/106.1, 36, 78, 132 D, 40/78.03, 78.07, 78.09; 240/2 AT, 9 R

[56] References Cited

U.S. PATENT DOCUMENTS

| | | | |
|---|---|---|---|
| 2,209,517 | 7/1940 | Flanagan et al. | 40/36 |
| 3,201,883 | 8/1965 | Schleisner-Meyer | 40/106.1 |
| 3,359,669 | 12/1967 | Masters | 40/106.1 |
| 3,402,491 | 9/1968 | Wagner | 40/106.1 |
| 3,456,372 | 7/1969 | Shoenfeld et al. | 40/106.1 |
| 3,783,542 | 1/1974 | Johnson | 40/132 R |
| 3,787,991 | 1/1974 | Siksai | 40/36 X |
| 3,813,797 | 6/1974 | Masters et al. | 40/106.1 X |

OTHER PUBLICATIONS

G.E. Rotoview Illuminator (52 panel) Operator, Service & Maintenance Manual, Feb. 1973.

*Primary Examiner*—John F. Pitrelli
*Attorney, Agent, or Firm*—McDougall, Hersh & Scott

[57] ABSTRACT

A storage and viewing device is disclosed for cut film radiographs. The device is provided with a combination of fluorescent lights and a spotlight in a plurality of discrete viewing areas. A transport mechanism moves panel mounted X-rays from a storage area to the viewing area and vice versa. An intermittent drive means is utilized for indexing the display panels into and out of the storage area. Means are provided for controlling the movement of the panels as they are transported to the display area to prevent jamming.

10 Claims, 20 Drawing Figures

X-RAY FILM STORAGE AND VIEWING DEVICE

BACKGROUND OF THE INVENTION

This invention relates to the field of film storage and viewing devices. More particularly, it relates to the field of devices for permitting the storage and display of cut film radiographs, i.e., x-rays. Such devices find wide application in medical environments as, for example, hospitals, laboratories, radiologist's offices and the like. Such devices permit the bulk storage of a large number of radiographs of current interest while at the same time permitting immediate access to such films when necessary for diagnosis, treatment or otherwise.

Storage and viewing devices of the type disclosed herein have been previously developed in the art. For example the Rotoview Illuminator sold by the General Electric Company is a device wherein cut film radiographs can be stored and displayed. In that device there is transport means for carrying panel mounted x-rays from the storage to the display area and vice versa. That device, however, has certain problems which are remedied by the present invention.

The Rotoview Illuminator has an illumination system wherein each distinct viewing compartment is provided with a fluorescent light source. The device is further provided with a single high intensity spotlight which is moved over the viewing area to spotlight a particular area of interest on an individual radiograph. This arrangement, however, does not permit sharp cut off of illumination between adjacent x-ray viewing areas, a feature which is highly desirable in order to provide good contrast and crisp detail.

A second problem area in the Rotoview Illuminator is its storage and transport mechanism. A continuous chain system is utilized for storage wherein the stored display panels are continuously moved until they reach a transport pick up point. Failure of the storage chain to properly time out with the main transport mechanism resulted in unsatisfactory operation including panel jamming.

A final problem area in the Rotoview Illuminator is the tendency of the display panels to exhibit pendulum action as they are moved through the system. This swinging motion, if not accurately controlled, is a further source of frequent jamming and possible damage to the machine, the display panels or the radiographs mounted thereon.

It is accordingly an object of the present invention to provide an improved x-ray film storage and viewing device.

It is a further object of the present invention to provide a device which is capable of transporting and storing display panels in an accurate and efficient manner.

It is another object of the invention to provide a storage transport system which utilizes a geneva intermittent movement to accurately control the timing between the storage and main transport system.

It is a further object of the invention to provide an illumination system for a display and storage device in which a sharply defined area of illumination can be produced thereby preventing diffusion of light from one viewing area to another.

It is a further object of the present invention to provide a panel stabilizing system incorporated in the transport system which will accurately and positively control the pendulum motion of the panels.

Another object of the invention is to provide a stabilized transport chain by use of high density polymer chain guides.

Other objects and advantages of the invention will be apparent from the remaining portion of the specification.

DETAILED DESCRIPTION

General Description of the Invention

The present invention employs a number of subsystems for the purpose of storing a plurality of display panels and selectively conveying these panels from storage to a display area. A unique lighting arrangement is employed at the display area whereby selected portions of the area can be lighted in a manner particularly useful for studying x-ray films which are mounted to the display panels. A primary drive system is employed to convey the display panels from the storage area at the bottom of the device to the display area. This primary drive system is reversible, that is, the display panels can be taken from either the front or rear of the storage area and brought to the display area. As a panel is removed from the storage area for display, another panel is returned to storage from the display area. A unique feature of the primary drive system is the provision of a cam mechanism for controlling the pendulum motion of the display panels. This mechanism includes a cam member and sprocket arrangement which prevents the panels from jamming.

Cooperating with the primary drive mechanism is the storage drive system. The storage drive system employs an intermittent drive mechanism which greatly simplifies the timing problems inherent in the prior art. The storage drive system in effect indexes the next panel to its proper pick up point before the primary system arrives at that point. After each pick up by the primary system, the storage system indexes the next panel into position while simultaneously making room for receiving the display panel which is returned to storage. Synchronism between the primary drive and the storage drive is obtained by use of a common drive shaft from the main system motor. Exact positioning of the display panels in the display area is obtained by use of limit micro switches adjustably located on a related drive shaft.

GENERAL ARRANGEMENT AND LIGHTING SUB-SYSTEM

Figure 1:
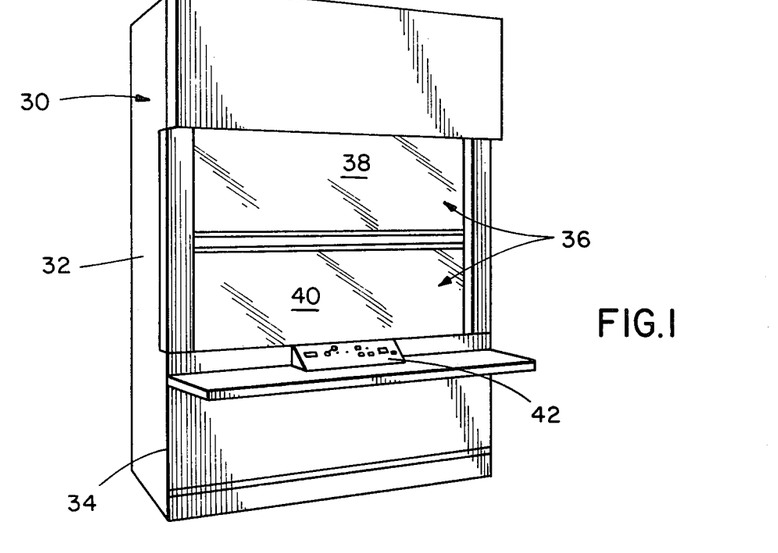
FIG. 1 is a front perspective view of the invention.
Figure 2:
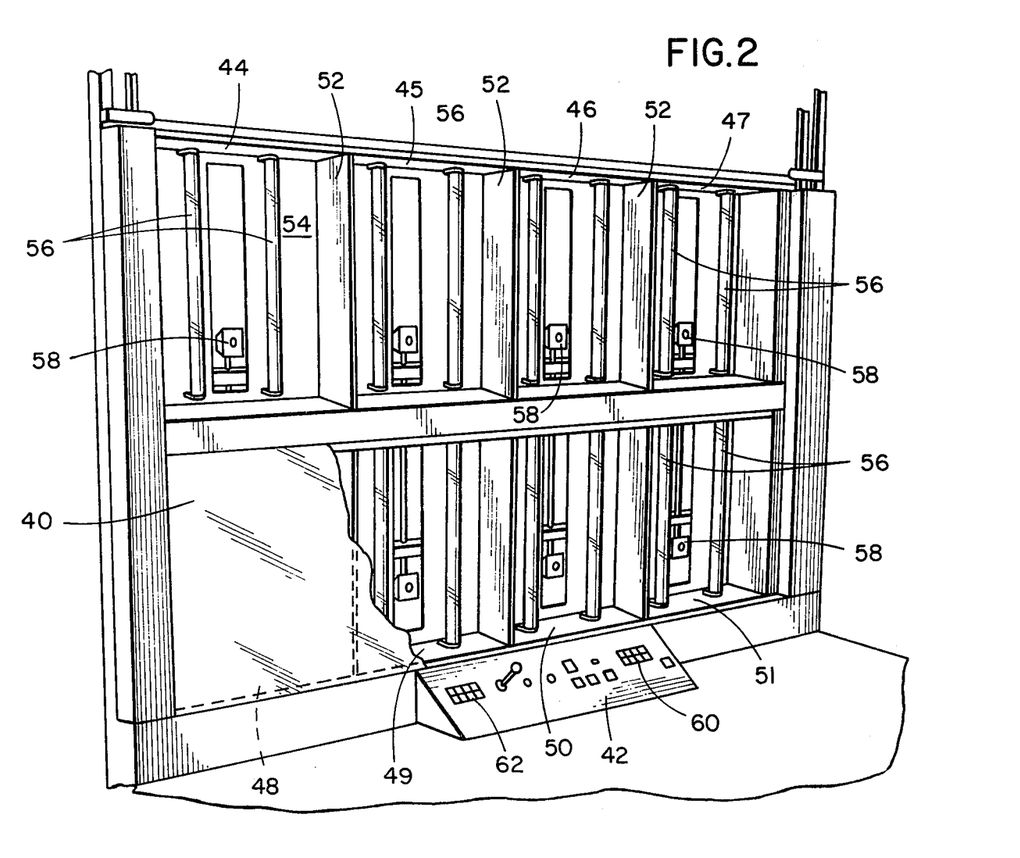
FIG. 2 is a perspective view of the light compartments from which the diffuser panels have been removed.
Figure 3:
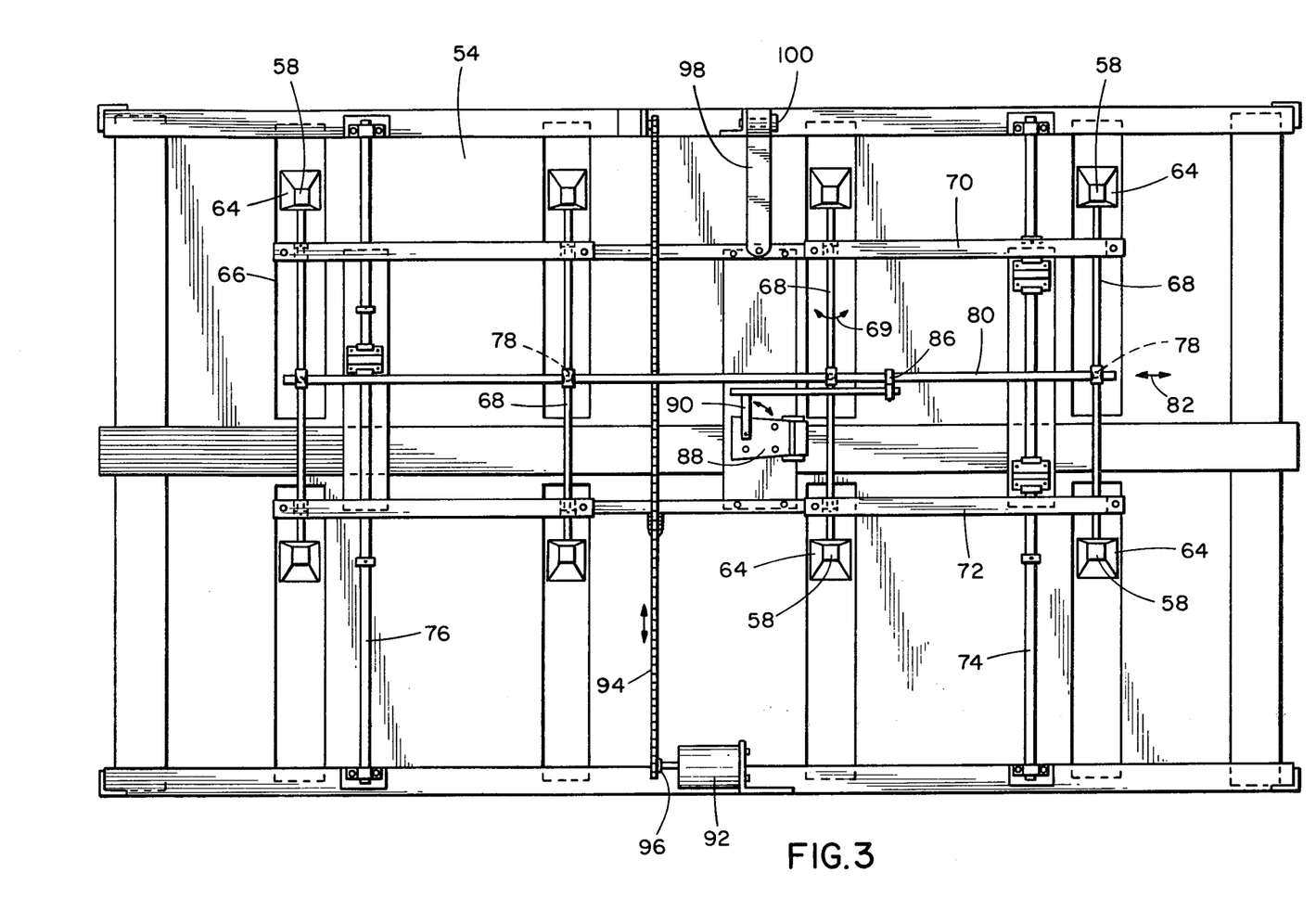
FIG. 3 is a rear elevation of the light compartments illustrating the operational details thereof.

Referring now to FIGS. 1 through 3, the device, and in particular the lighting sub-system, is illustrated. The device 30 is enclosed in a housing 32 having a storage area in the lower portion 34 thereof and a display area 36. In the embodiment illustrated the display area 36 is sufficiently large that two x-ray display panels can be simultaneously presented for inspection. A display panel is accurately positioned over the light diffusers 38 and 40, which serves to back light the x-ray film mounted on the display panel. The person inspecting the x-ray operates a control panel 42 to select the desired lighting effect and to control which display panels are presented at the display area 36.

With reference to FIGS. 2 and 3, the lighting details are illustrated. In FIG. 2 the diffuser panels 38 and 40 have been removed. In the present embodiment a total of eight separate light compartments 44 through 51 are illustrated. It will be appreciated that a greater or lesser number of such compartments can be provided depending only upon the desire of the end user. Each compartment is separated from the other by a baffle 52 which extends from a back plate 54 to a position in contact with the light diffusers 38 and 40. It will be appreciated, therefore, that light generated in one compartment cannot leak into adjacent compartments. This is a substantial improvement over the prior art for a reason to be explained.

Lighting within each compartmemt is provided by fluorescent tubes 56 and by a spotlight 58. The fluorescent tubes provide general back lighting for viewing an x-ray while each spotlight 58 permits highlighting of a particular detail of interest.

It is possible by operation of the control panel 42 to independently control each set of fluorescent tubes so that any of the compartments may be lighted or darkened, as desired. It is further possible to move the spotlights 58 within the compartment to highlight virtually any point within the conpartment with or without the concurrent operation of the fluorescent tubes 56. Regardless of light selection it is to be emphasized that due to the configuration of the separator baffles 52, there is a sharp cut off between adjacent compartments even when the edge of one compartment has the spotlight positioned thereat.

Operation of the fluorescent tubes 56 is controlled by eight pushbutton switches 60 located on the control panel 42. Operation of the spotlights 58 is controlled by the eight pushbutton switches 62. Preferably, the switches 62 are interlocked such that only one spotlight 58 can be illuminated at a time in order to simplify the lighting system.

Referring to FIG. 3, the details of the spotlight positioning system is disclosed. As indicated, the spotlights 58, which preferably include reflectors 64, extend into each light compartment through a vertical slot 66 in the back plate 54. The eight spotlights are mounted by means of a pivot rod 68 to a vertically movable frame comprising an upper frame member 70 and a lower frame member 72. The frame members 70 and 72 are moved vertically on a pair of guide rods 74 and 76 in a manner to be described. The pivot rods 68 are mounted to the frame members in bearings for rotation about a vertical axis as indicated by the arrow 69.

Rotation of the pivot rod 68 is accomplished by a reversible motor and linkage arrangement including a swing arm 78 connecting an operating rod 80 to the pivot rod 68. In turn, the operating rod 80 which moves horizontally in the direction indicated by arrow 82 is activated by a pivot 84 through a swivel connector 86. The pivot 84 is connected to drive motor 88 by means of a link arm 90. As will be apparent to those skilled in the art, operation of motor 88 causes rotation of the arm 90 causing the pivot 84 and the operating rod 80 to move in the horizontal direction. Through the swing arm 78 this linear horizontal motion is translated to rotational movement of pivot rods 68. The effect of this motion is to permit the spotlights 58 to focus from left to right or vice versa completely across each light compartment.

By means of a vertical positioning system, the spotlights can be moved vertically to any desired location within each compartment. The vertical positioning system includes a reversible motor 92 which drives a chain 94 from a sprocket 96 connected to the motor drive shaft. The chain is secured at each end to one of the frame members 70 and 72. In order to balance the frame load which the motor must move a constant force spring 98 is attached to the upper frame member 70, the other end of which is wrapped about a mandrel 100 secured to the machine housing. In effect, this counter balances the weight of the frame permitting the motor 92 to move the system with far less power. Operation of motor 92 is effective for moving the frame upwardly or downwardly on the guide rods 74 and 76 so as to position the spotlights as desired within the light compartments.

Thus, by selective operation of motors 88 and 92 the vertical and horizontal positioning of the spotlight beam can be set as desired. Each spotlight beam can reach virtually any point within a compartment but there will be no appreciable leakage of light from one compartment to the other.

The motors 88 and 92 are fractional horsepower electrical motors and preferably double stacked AC motors with indefinite stalled torque characteristics. This eliminates any need for limit switching to prevent damage at the travel extremes.

PRIMARY DRIVE SYSTEM

Figure 4:
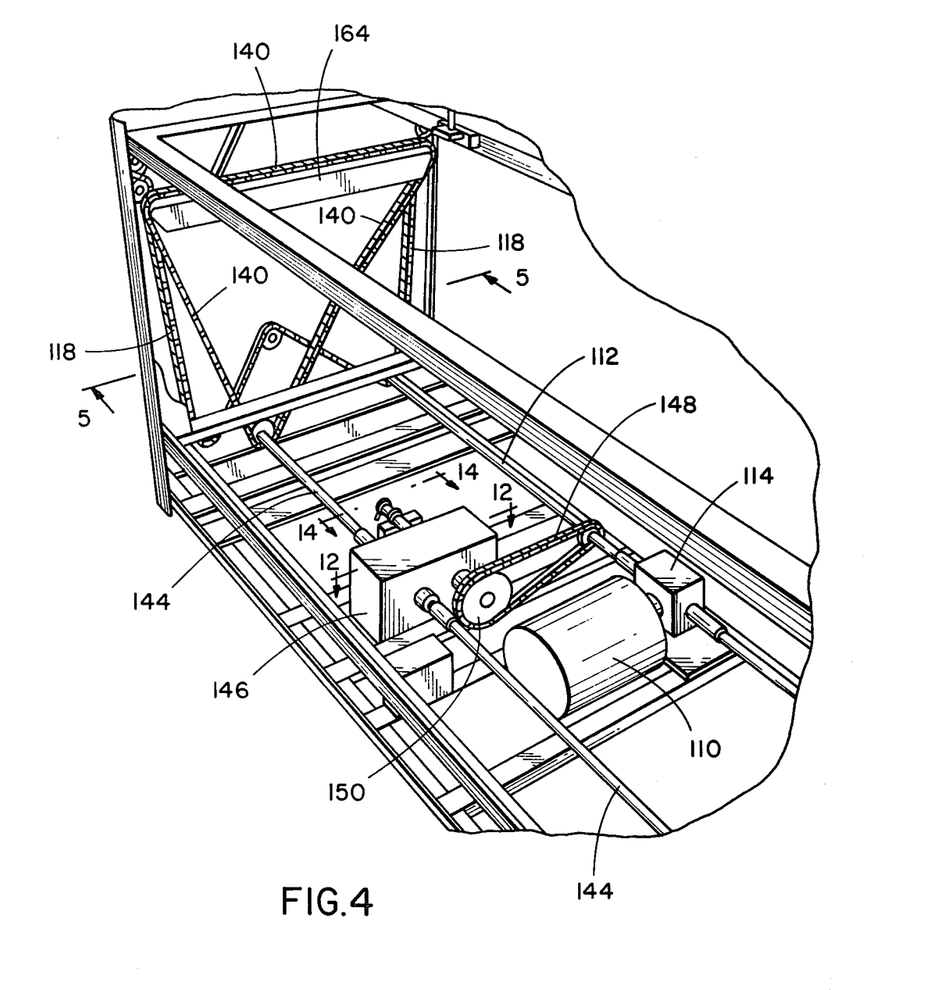
FIG. 4 is a rear perspective of the device illustrating portions of the drive mechanism.
Figure 5:
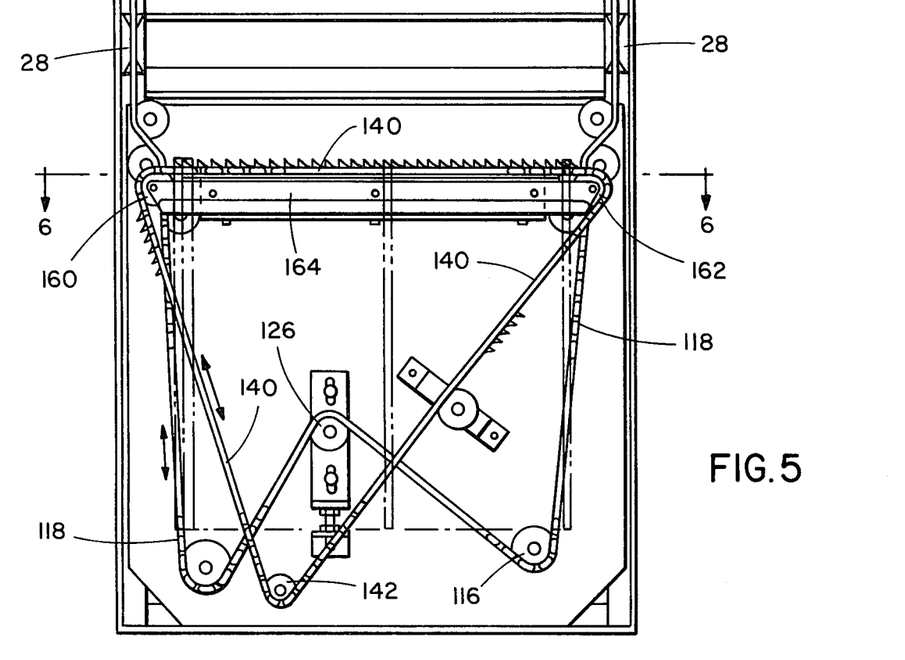
FIG. 5 is an end elevation taken along the lines 5—5 of FIG. 4.
Figure 6:
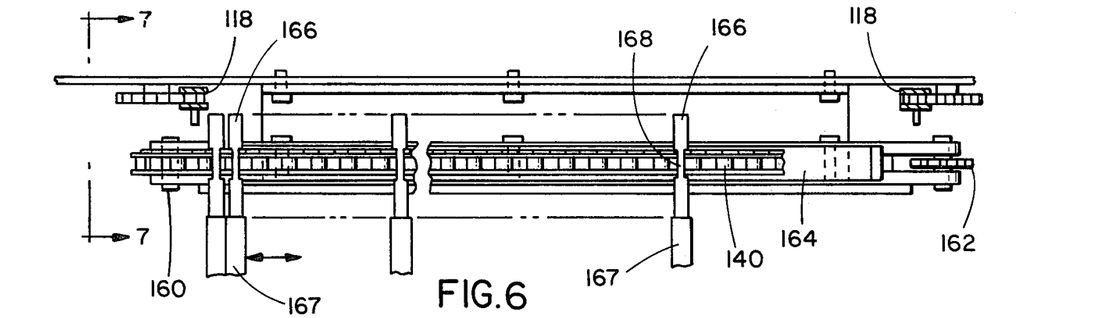
FIG. 6 is a top view along the lines 6—6 of FIG. 5.
Figure 7:
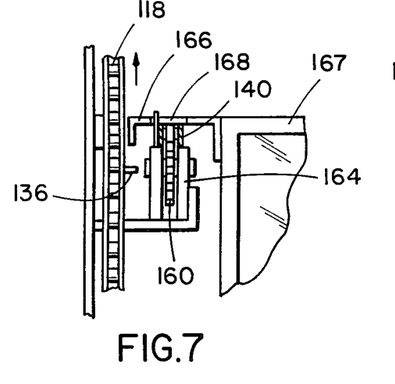
FIG. 7 is a view along the lines 7—7 of FIG. 6.
Figures 9, 10, 11:
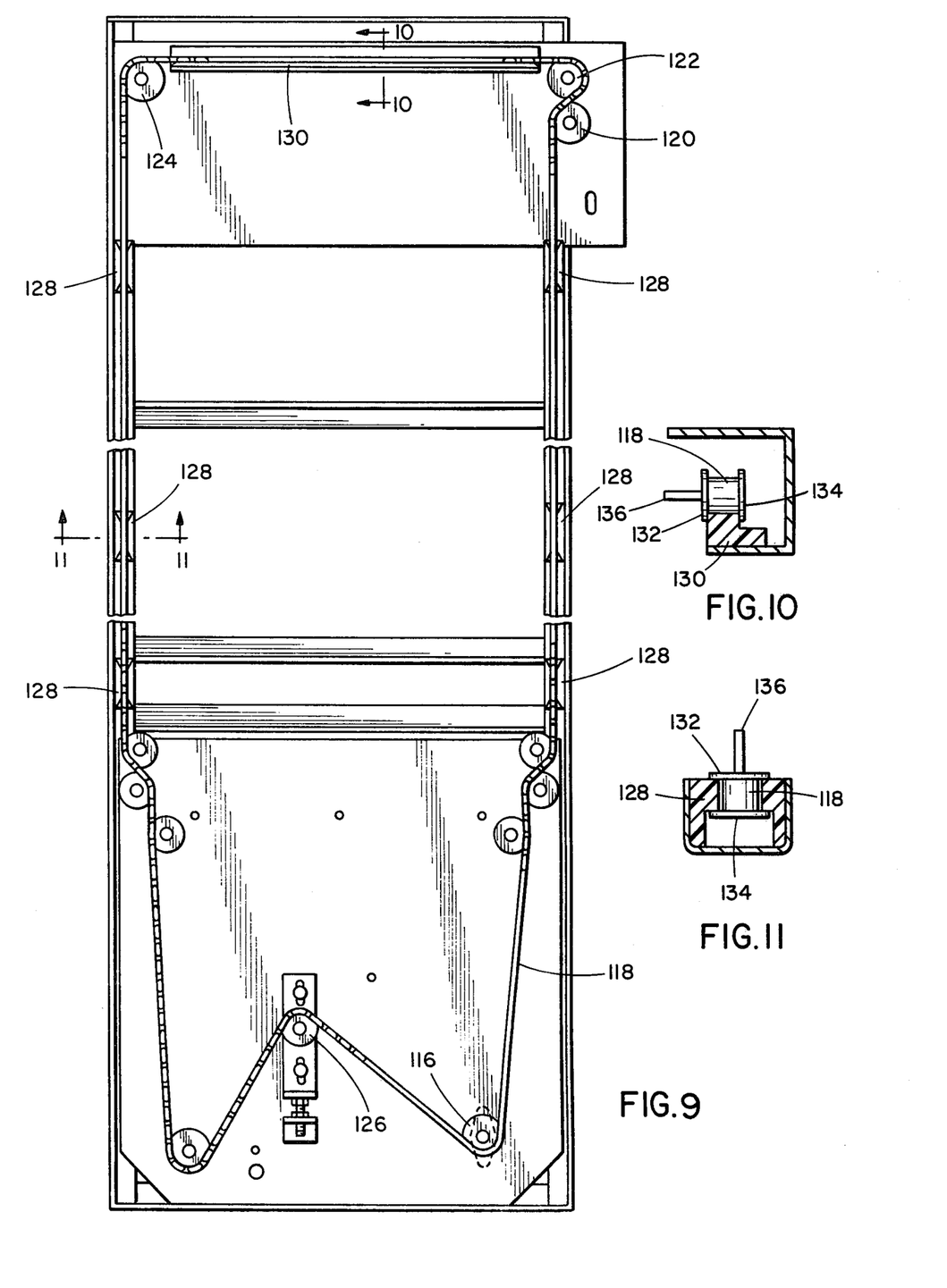
FIG. 9 is a view similar to FIG. 5 illustrating the entire primary chain system.
FIG. 10 is a sectional view through the horizontal chain guide along the lines 10—10 of FIG. 9.
FIG. 11 is a sectional view through the vertical chain guide along the lines 11—11 of FIG. 9.

Referring to FIGS. 4, 5 and 9, the details of the primary drive are illustrated. The main drive motor 110 drives the main drive shaft 112 via a gear reduction unit 114. Drive shaft 112 is connected to drive sprocket 116 for driving the primary drive chain 118 entrained thereon. Primary drive chain 118, as indicated in FIG. 9, traverses the distance from the bottom of the machine up the front of the device around guide sprockets 120 and 122 past sprocket 124 and down the back of the machine past tension idler 126 to complete the circuit. Throughout this description the primary drive chain will be referred to in the singular. It will be appreciated, however, that an identical chain drive system is provided on each side of the device.

The drive chain 118 is stabilized against lateral movement by use of a plurality of guides, elements including vertical guide 128 and horizontal guides 130. These guides are formed of high density polymer materials and are self-lubricating and materially reduce the audible noise which is produced by an unsupported chain drive. The details of the chain guides are illustrated in FIGS. 10 and 11. The chain is stabilized in position by the portion of the guide which protrudes between the outer faces 132 and 134 of the chain links. The chain guides in addition to reducing noise effect a marked reduction in the tendency of panels conveyed on the chain to sway or rock free thereby jamming the device by preventing lateral chain movement.

The primary drive chain 118, as mentioned, is driven from the sprocket 116 by the main drive motor 110. This motor is reversible and accordingly the chain can be driven in either the forward or reverse direction so that display panels carried on pick up pins 136 can be moved to and from the display area.

Referring now to FIGS. 4 through 7, the details of the secondary or storage drive system will be described. The storage drive system includes a storage drive chain 140 driven by a drive sprocket 142. Sprocket 142 is powered by an intermittently driven shaft 144 from an intermittent drive device 146. Device 146 is commonly referred to as a geneva movement and is powered off the main drive shaft 112 via a take off belt 148 and its associated pulley 150. The geneva device will be considered in detail below but its operation may be briefly summarized as follows. As the main drive shaft rotates, the belt and pulley 148 and 150 effect a gear reduction from the main shaft to the geneva device. For every so many revolutions of the pulley 150, on a continuous basis, an intermittent rotation of shaft 144 is obtained. That is, shaft 144 will repeatedly rotate a selected amount and stop. This geneva device, therefore effects an indexing operation to be described.

The storage drive chain 10 is intermittently driven in either direction depending upon the rotational direction of the main drive shaft 112. The storage drive chain is entrained about a pair of guide sprockets 160 and 162 and passes over a guide member 164. As best indicated in FIG. 5, the storage chain has a plurality of triangular shaped teeth with sufficient space therebetween for receiving pick up arms 166 which support a display panel 167.

Figure 8:
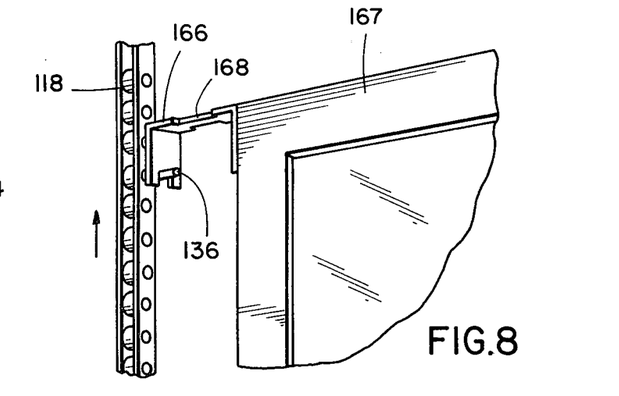
FIG. 8 is a partial perspective view illustrating the manner in which the panels are carried on the primary chain.

Storage of the display panels is provided along the portion of the storage chain supported by member 164. (see FIG. 16) The panel pick up arms 166 rest on the chain at a necked down portion 168. The panels which are stored on the storage chain are indexed forwardly or rearwardly by the intermittent movement of the storage chain. When the device is running such that the stored panels are indexed toward the rear of the device (to the left in FIG. 5) the most rearward panel is moved to and maintained in the position illustrated in FIGS. 6 and 7. That is, it is directly in the path of the pick up pin 136 of the primary chain 118. As the primary chain moves upwardly (FIG. 7) the pick up pin 136 enters the U-shaped opening in the arm 166 lifting the panel attached thereto off of the storage chain. As upward movement continues, a further intermittent movement of the storage chain indexes the next panel into position for an identical operation. The support of a display panel 167 on a pick up pin 136 is illustrated in FIG. 8.

Operation of the device in the reverse direction, with reference to the immediately preceding discussion, is effective for depositing the panel carried by the pick up pin back into the storage chain for subsequent indexing toward the front of the machine. To summarize, the storage drive system is driven from the primary drive system to insure accurate timing. The storage drive system employs an intermittent drive device which moves a panel to be picked up by the primary system to the pick up position prior to the arrival of the pick up pin and then lets the panel wait for the arrival of the pin. While pick up occurs shortly thereafter, the slight waiting period greatly simplifies the interaction between the systems and reduces critical timing requirements.

INTERMITTENT DRIVE DEVICE

Figure 12:
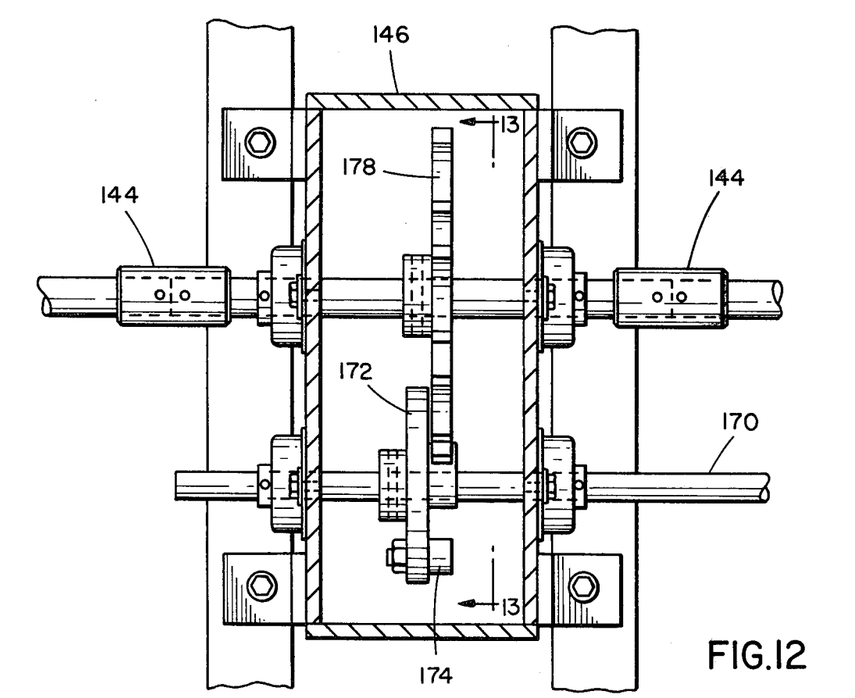
FIG. 12 is a plan view of the intermittent drive mechanism for the storage transport.
Figure 13:
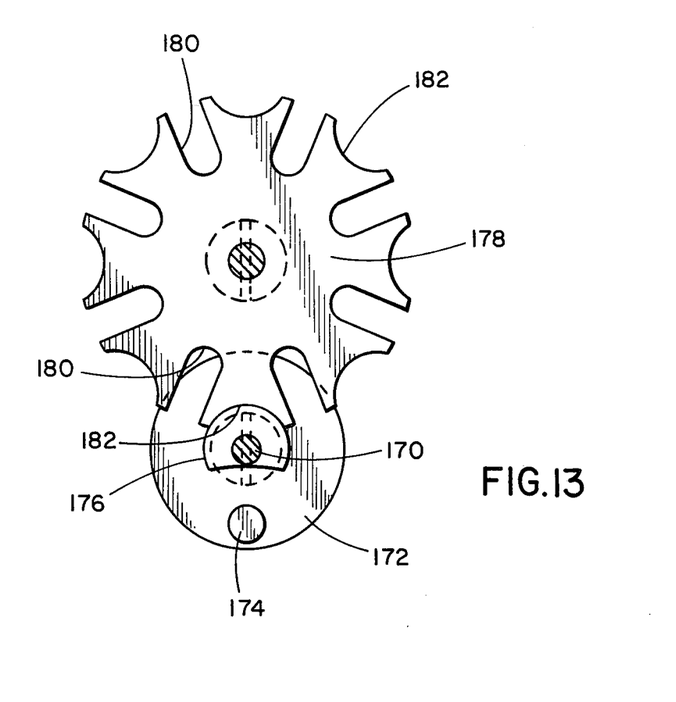
FIG. 13 is a view along the lines 13—13 of FIG. 12 illustrating the details of the intermittent drive mechanism.

Referring to FIGS. 12 and 13, the geneva or intermittent drive device 146 is illustrated. Geneva devices are well known in the art and accordingly only the essential elements of the present device are indicated in the following description. The geneva device receives power on the pulley shaft 170 from the belt pulley 150 (FIG. 4). Shaft 170 is connected to a drive gear 172 which has a drive roller 174 positioned thereon. Centrally disposed on the drive gear 172 is a locking collar 176 which is substantially crescent shaped. In operative engagement with the drive gear 172 is an intermittent gear 178 having a plurality of channels 180 and locking recesses 182 spaced therearound. The intermittent drive shaft 144 is connected to the gear 178.

With reference to FIG. 13, it will be appreciated that during rotation of pulley shaft 170, drive gear 172 rotates. The intermittent gear 178, however, is prevented from rotating by the engagement of locking collar 176 with locking recess 182. This arrangement continues until the drive roller 174 approaches the intermittent gear. At that point the locking collar ceases to engage the recess and the drive roller enters a channel 180.

Continued movement of the drive gear is effective for causing the drive roller to move the intermittent gear a predetermined amount depending upon the dimensions of the channels, the positioning of the drive roller, the size of the drive gear, etc. When the drive roller finally exits the channel, the intermittent gear is once again locked in position by the locking collar 176 until the next revolution of the drive gear. In this manner an intermittent rotation of shaft 144 is produced for the purpose of sequentially indexing the display panels supported on the storage chain. Regardless of which direction the intermittent drive is going, this indexing positions one display panel for pick up by the primary chain while providing room for another display panel which is being returned to storage by the primary chain.

Figure 14:
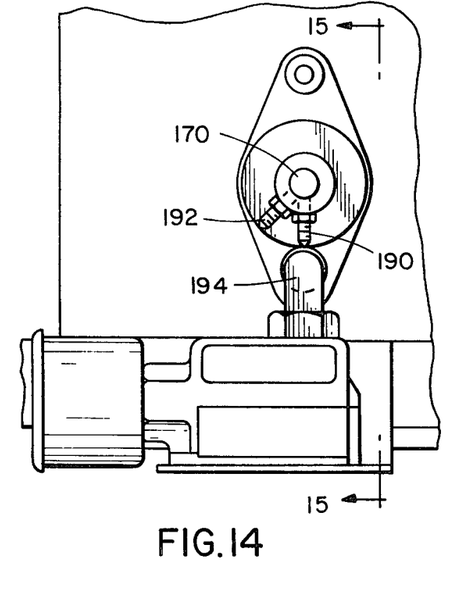
FIGS. 14 and 15 are end and side elevations, respectively, of the switch fingers which operate micro switches for positioning the panels.
Figure 15:
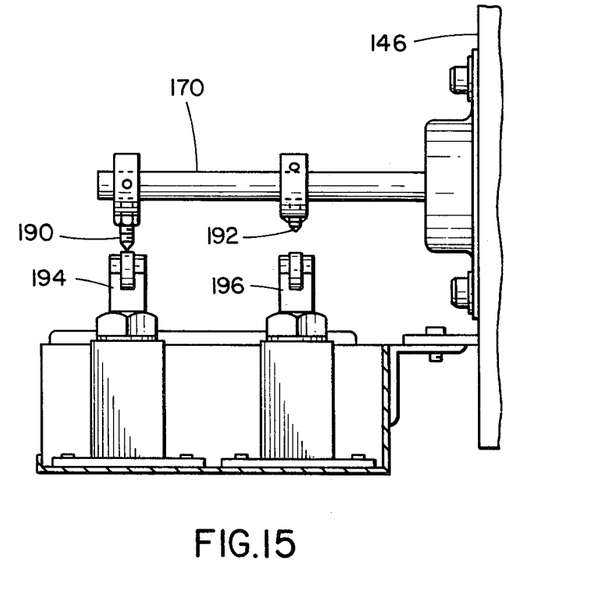

FIGS. 14 and 15 illustrate the manner in which accurate positioning of the display panels over the display area is obtained. Attached to the pulley shaft 170 are a pair of rotationally adjustable switch fingers 190 and 192. These switch fingers operate limit micro switches 194 and 196, respectively, and control the shut off point for the main drive motor 110. By appropriately setting the angular position of the fingers 190 and 192, the machine will accurately position the display panels regardless of the direction in which the device is operating, as will be described in connection with the schematic of FIG. 20.

Figure 16:
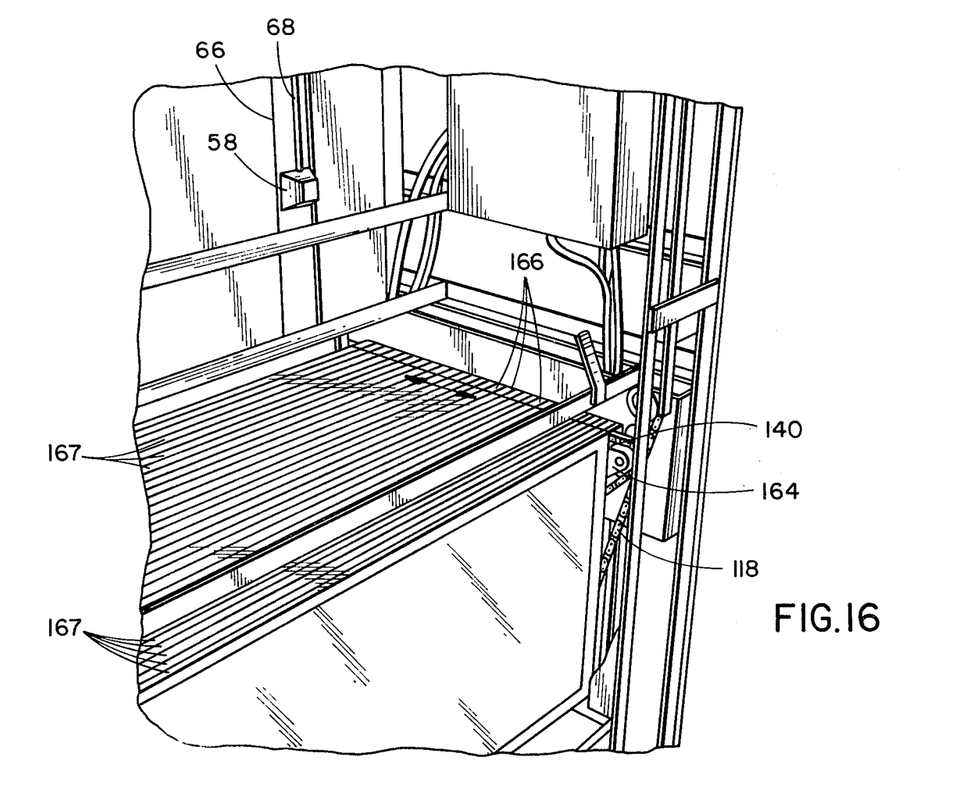
FIG. 16 is a rear perspective illustrating the manner in which the display panels are stored in the device.
Figure 17:
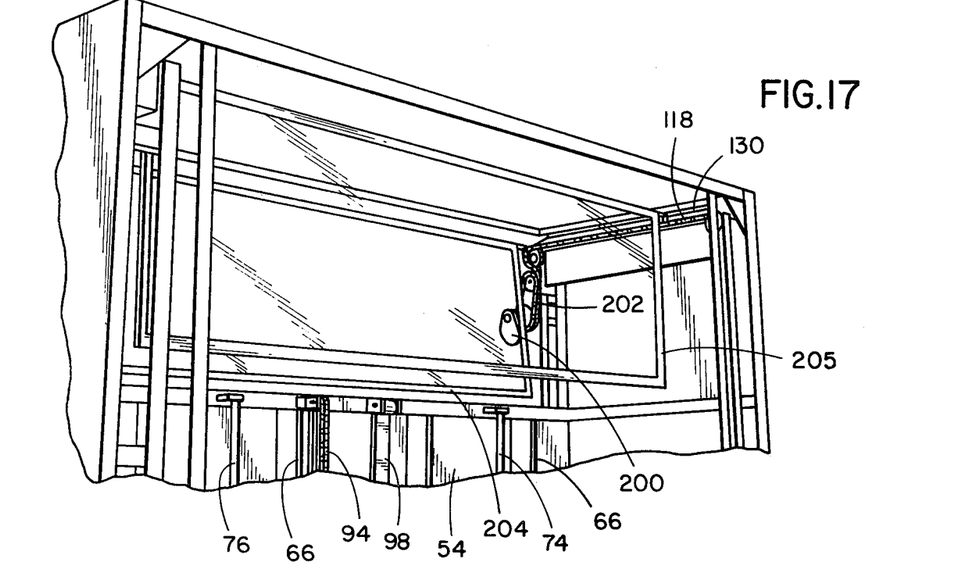
FIG. 17 is a rear perspective illustrating the manner in which the display panels are transported to the display area.
Figure 18:
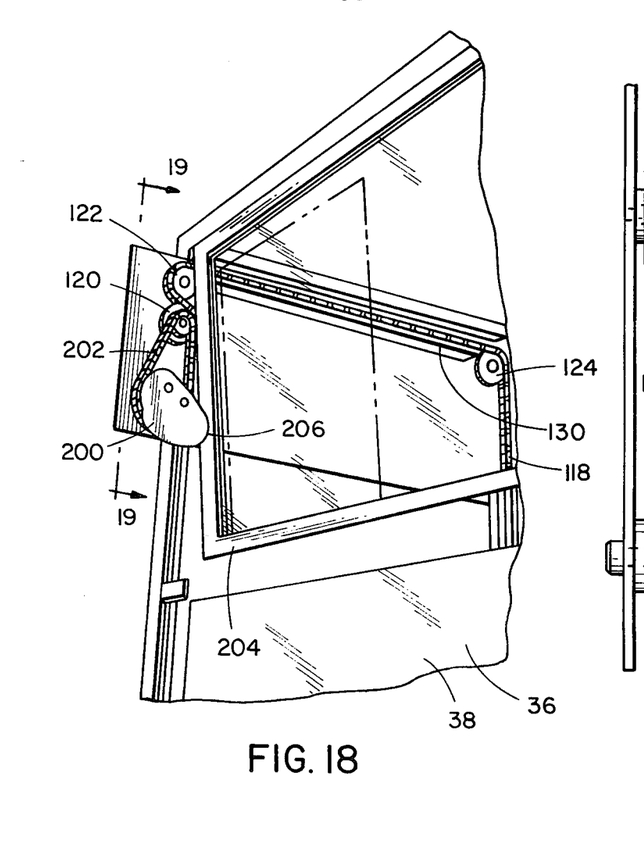
FIG. 18 is a front perspective illustrating the manner in which the pendulum motion of the display panels is positively controlled during movement to or from the display area.

Summarizing the storage system and with particular reference to FIG. 16, the plurality of display panels 167 illustrated are moved either forwardly or rearwardly by the intermittent indexing operation of the geneva device 146. When they are moved in the forward direction, the forward most panel is picked up while space is made at the rear of the storage chain for receiving a display panel which is dropped off by the primary chain. Reverse operation of the device in this regard is identical. The rearward most panel is picked up while the forward most panel is entered into the storage indexing system.

PANEL TRANSPORT STABILIZATION MECHANISM

Referring to FIGS. 9 and 17 through 19, an important aspect of the invention is illustrated. As mentioned in the background section of this application, a significant problem with prior art devices is the inability to control undesirable panel movement during transport. In the prior art Rotoview Illuminator and in the present invention display panels can enter the display area from above or below.

When a display panel enters the viewing area from the top of the device or returns to the storage area by that route, the panel is subjected to a change in motion from vertical to horizontal and back to vertical in a relatively short period of time. These rapid direction changes will cause the display panels to exhibit an extreme pendulum action. This motion, if not controlled in a precise and positive manner, permits the display panels to become uncoupled from the primary chain or to be improperly oriented so that a panel will not pass between the structural members which surround the viewing area. In short, failure to control this pendulum motion leads to jamming and unsatisfactory operation.

The present invention provides means for stabilizing and precisely controlling the movement of the display panels. The display panels are stabilized and their orientation precisely controlled by a pair of cams 200 driven by a timing chain which is interconnected with the primary chain. The cams and associated gearing damp the pendulum motion and control the movement of the panels at the critical point in the transport path.

Referring to FIG. 9, it will be observed that at the top front of the machine the primary chain 118 passes in front of a guide sprocket 120 and then behind a guide sprocket 120, when the primary chain is driven in what is hereby defined as the forward direction. As can be appreciated from this arrangement, the top end of a panel carried by the primary chain follows the primary chain around the upper guide sprocket 122.

On each end of the machine at the front is a rotating cam 200 driven by a timing chain 202. Cams 200 engage the lower middle portion of a display panel as the upper portion of the panel begins its movement around guide sprocket 122.

The pendulum motion, which is controlled by the cams, begins with the initial transition from vertical movement to horizontal movement as the panel passes guide sprocket 124. This pendulum motion continues until the panel nears guide sprocket 122. At that point its lower middle portion is first engaged by the surface of the cams 200 to effect an initial damping of the pendulum movement. As the display panel follows the primary chain around guide sprocket 122, the elongated portion 206 of the cam is timed to press the bottom portion of the panel towards the back of the machine. This not only completes the damping of the pendulum motion, but also positions the panel for its subsequent downward movement into the display area. As the panel passes beneath the lower guide sprocket 120, the cam completes its cycle and the panel is suspended on the primary chain without pendulum motion and is lowered along the guide frame into the viewing area by the downward movement of the primary chain.

In the case where the primary chain is operated in what is herein defined as the reverse direction, i.e., wherein panels are taken from the display area and put into storage via the top of the machine, the cam operates in the reverse direction providing desirable damping as each panel comes up the front of the machine and is shifted to horizontal motion along the top of the device. A cam arrangement is unnecessary at the rear sprocket 124 inasmuch as any pendulum motion of the display panels can be tolerated since the panels are not entering the display area and need not pass between the adjacent guide frame.

Figure 19:
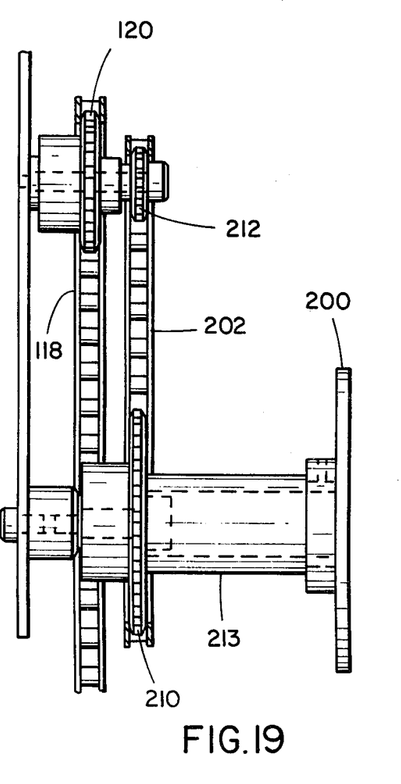
FIG. 19 is a side elevation along the lines 19—19 of FIG. 18.

Referring to FIG. 19, the drive mechanism for cam 200 is illustrated. The cam is mounted on a sprocket 210 and extends outwardly therefrom due to the presence of spacer 212. Sprocket 210 is driven by the cam timing chain 202 which, in turn, is driven through a gear reducing sprocket 212 connected to the lower guide sprocket 120. Thus, the primary chain drives the timing chain 202 and cam 200 to maintain the precise timing relationship necessary for effective damping and positioning action of the display panels. Considering the effect of the cam on the display panels, it will be seen that the damping and positioning is accomplished by moving the top of the display panel in a forward direction while restraining the lower middle portion of the panel by engagement with the cam. The cam is designed so that at all times the top of the display panel is maintained forwardly of the bottom of the display panel.

MACHINE CONTROL SCHEMATIC

Figure 20:
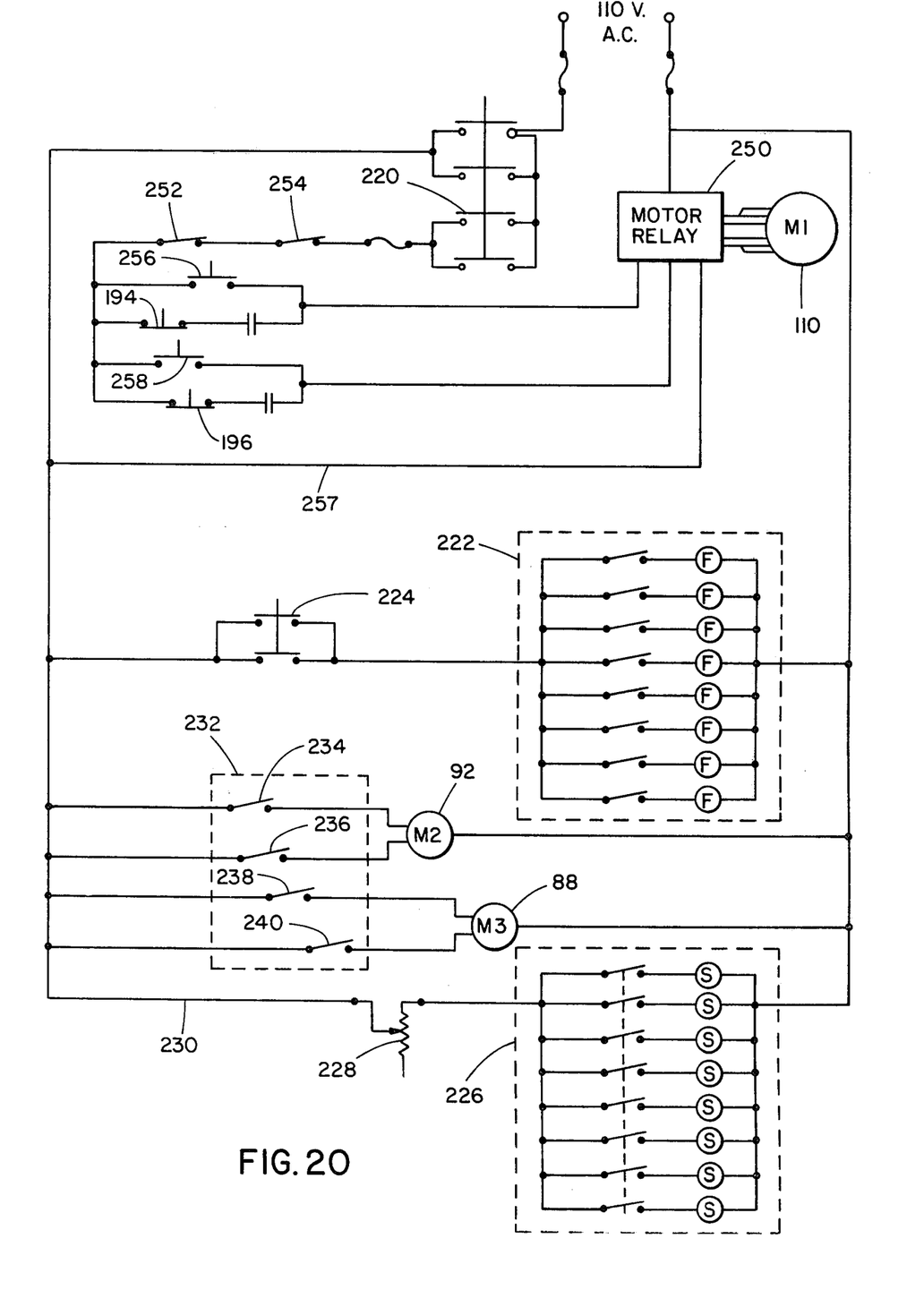
FIG. 20 is a schematic diagram of the electrical control system for the device.

Referring to FIG. 20, the electrical schematic for the invention is illustrated. The device preferably is powered from a standard 117 volt AC source. A master power switch 220 is operated to turn on the device. The fluorescent lights for general lighting of the display area are individually switched through a series of eight pushbutton switches indicated in dashed box 222. A fluorescent light master switch 224 is provided for convenience.

The eight spotlights are controlled by pushbutton switches indicated in dashed box 226. As indicated, these switches are preferably ganged so that an exclusive one of eight operation is obtained, that is, closing one of the switches in box 226 opens any other switches which have been previously closed. If desired, a spot dimmer 228 may be provided to regulate the intensity of the spotlights. Additionally, if desired, a timer switch may be provided in line 230 to enhance life of the spotlights by preventing inadvertent operation for long periods of time.

Positioning of the spotlights is controlled by a series of four position switches indicated in dashed box 232.

Switches 234 and 236 control operation of motor 92 (FIG. 3) for moving the spotlights up or down. Switches 238 and 240 control motor 88 (FIG. 3) for causing a desired degree of angular rotation of the spotlight pivot rods. If desired, the switches in box 232 may be replaced with a well known "joy stick" arrangement whereby the spotlights can be positioned by movement of the joy stick.

The main drive motor 110 is operated through a motor relay 250 which relay may be of a conventional type, such as a Stouthers and Dunn Model A275KXX91. Such a relay has a number of contacts, such as contacts MR1 and MR2, illustrated in the upper portion of the schematic. These are holding contacts which, when energized, maintain operation of the motor until the circuit to the contacts is interrupted. Power to the contacts MR1 and MR2 is provided via the power switch 220, jam switch 252 and 254 and pushbutton switches 256 and 258. Line 257 is the power line to the motor energized by the relay. The jam switches detect a panel jamming in the display area and cease operation of the machine to prevent damage to the panel or the device. These switches are normally closed.

Pushbutton switches 256 and 258 are provided on the control panel and are normally open. When it is desired to move a display panel from storage to the display area, one of the switches 256 and 258 is actuated. Operation of switch 256 closes motor relay contacts MR1 causing motor relay 250 to operate motor 110 in the forward direction, i.e., panels are taken from the rear of the storage chain, carried on the primary chain across the top of the device and are fed downwardly to the display area. Actuation of pushbutton 258 is effective for closing motor relay contacts MR2 producing reverse operation of motor 110 operating the primary chain in the backward direction. In that case display panels are taken from the front end of the storage up past the display area and are returned to storage across the top of the machine to the rear of the storage area.

As mentioned earlier in connection with FIGS. 14 and 15, the correct positioning of the display panels over the display area is highly important in order that the illumination system can be fully utilized. In order to accurately position the display panels in the display area, the switch fingers 190 and 192 are properly positioned on the shaft 170 so that when the display panels are centered over the display area, the fingers strike the micro switches 194 and 196. These micro switches are the normally closed switches illustrated in the relay holding circuit of FIG. 20. When actuated the switches serve to break the circuit to the motor relay contacts thereby stopping the main drive motor 110 at precisely the right time. A separate micro switch is provided for each direction to avoid any misalignment problem.

While I have shown and described a preferred embodiment of this invention in some detail, it will be understood that the description and illustrations are offered merely by way of example, and that the invention is to be limited in scope only by the appended claims.

We claim:

1. In a system for storing and displaying display panel mounted cut film radiographs including: a storage area, a display area, and a main conveyor for carrying said panels between said storage and display areas by lifting said panels at one end thereof, the improvement comprising:
   means for positioning and damping pendulum motion of said panels when carried on said conveyor to and from said display area,
   said positioning and damping means including a pair of cams rotated synchronously with said conveyor in a direction corresponding to the direction of movement of said conveyor, said cams positioned to contact the other, free swinging, end of said display panels carried by said conveyor to restrain said swinging end relative to said one end whereby pendulum motion is damped and the panel is correctly positioned for entry to or egress from the display area.

2. The system according to claim 1 wherein said positioning and damping means includes a timing chain driven by said conveyor, said timing chain rotating said cams synchronously with movement of said panels on said conveyor.

3. A system for displaying cut film radiographs comprising:
   a. at least two adjacent light compartments each compartment separated from the adjacent compartments by a baffle,
   b. translucent diffuser panels provided over said compartments on which said radiographs are positioned for viewing,
   c. first lighting means in each compartment for over all illumination of said radiograph,
   d. second lighting means in each compartment for spotlighting selected areas of said radiograph,
   e. electrically controlled means for rotational and translational positioning of the second lighting means within said compartment to spotlight substantially any portion of a radiograph,
   said baffle preventing light from one compartment from diffusing into the viewing area of an adjacent compartment thereby to provide a sharp lighting cut off.

4. The system according to claim 3 wherein said baffle extends from the rear of said compartment to a point of contact with said diffuser panels.

5. The system according to claim 3 wherein said first lighting means are fluorescent lamps.

6. The system according to claim 3 wherein said translational positioning means includes:
   a. a movable frame to which said second lighting means is mounted,
   b. drive means for selectively moving said frame.

7. The system according to claim 6 wherein said frame is vertically movable and said drive means is a directionally reversible motor.

8. The system according to claim 6 further including counter balance means for offsetting the weight of said frame to facilitate movement of said frame by said drive means.

9. The system according to claim 3 wherein said rotational positioning means includes
   a. a pivot rod to which said second lighting means are mounted,
   b. a mechanical linkage connected to said pivot rod for rotating said rod,
   c. drive means for selectively moving said linkage to rotate said second lighting means.

10. The system according to claim 9 wherein said drive means is a reversible motor.

* * * * *